(12) United States Patent
Jackson et al.

(10) Patent No.: US 12,034,888 B2
(45) Date of Patent: *Jul. 9, 2024

(54) SYSTEMS, METHODS AND APPARATUS FOR CONVERTING BETWEEN WIRELESS PROTOCOLS

(71) Applicant: DISH Technologies L.L.C., Englewood, CO (US)

(72) Inventors: Mark Jackson, Castle Rock, CO (US); Paul Langer, Westminster, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/346,192

(22) Filed: Jun. 11, 2021

(65) Prior Publication Data

US 2021/0306465 A1 Sep. 30, 2021

Related U.S. Application Data

(63) Continuation of application No. 16/921,908, filed on Jul. 6, 2020, now Pat. No. 11,039,016, which is a continuation of application No. 15/228,456, filed on Aug. 4, 2016, now Pat. No. 10,708,438.

(51) Int. Cl.
| | |
|---|---|
| *H04W 72/00* | (2023.01) |
| *H04B 7/155* | (2006.01) |
| *H04M 7/00* | (2006.01) |
| *H04L 5/00* | (2006.01) |
| *H04M 7/12* | (2006.01) |
| *H04W 88/08* | (2009.01) |

(52) U.S. Cl.
CPC ........ *H04M 7/006* (2013.01); *H04B 7/15528* (2013.01); *H04L 5/001* (2013.01); *H04M 7/1205* (2013.01); *H04W 88/08* (2013.01)

(58) Field of Classification Search
CPC ................ H04M 7/006; H04M 7/1205; H04B 7/15528; H04W 88/08; H04L 5/001
USPC .......................................... 455/451; 370/338
See application file for complete search history.

(56) References Cited

U.S. PATENT DOCUMENTS

| | | | | |
|---|---|---|---|---|
| 8,601,529 | B1 * | 12/2013 | Barzegar | ............. H04L 12/2827 725/150 |
| 2002/0089609 | A1 * | 7/2002 | Yamamoto | ......... H04N 21/4263 348/E5.114 |
| 2005/0034159 | A1 | 2/2005 | Ophir et al. | |
| 2012/0260299 | A1 | 10/2012 | Kotecha et al. | |

(Continued)

*Primary Examiner* — Marcos Batista
(74) *Attorney, Agent, or Firm* — Perkins Coie LLP (57) ABSTRACT

Various embodiments of systems, devices, and methods are described for wireless communication. In one example a first wireless signal is received in a first radio frequency spectrum using a first antenna exterior to a building. The first wireless signal is associated with a first wireless protocol. The first wireless signal is converted into a first intermediate signal associated with a coaxial protocol. The first intermediate signal is transmitted to an interior of the building using a coaxial cable. The first intermediate signal is converted into a second signal associated with a second wireless protocol. The second signal is then transmitted in a second radio frequency spectrum using a second antenna interior to the building. The second signal is transmitted using the second wireless protocol.

20 Claims, 6 Drawing Sheets

(56) References Cited

U.S. PATENT DOCUMENTS

| | | | |
|---|---|---|---|
| 2013/0322251 A1* | 12/2013 | Kotecha | H04H 20/63 370/236 |
| 2014/0198258 A1* | 7/2014 | Ling | H04N 21/4263 348/731 |
| 2015/0223243 A1* | 8/2015 | Tabet | H04L 5/001 370/330 |
| 2016/0007378 A1 | 1/2016 | Bertorelle | |
| 2018/0041999 A1 | 2/2018 | Jackson | |
| 2018/0042065 A1 | 2/2018 | Jackson | |
| 2020/0336600 A1 | 10/2020 | Jackson | |

* cited by examiner

SYSTEMS, METHODS AND APPARATUS FOR CONVERTING BETWEEN WIRELESS PROTOCOLS

This application is a continuation of U.S. patent application Ser. No. 16/921,908 filed Jul. 6, 2020, entitled "SYSTEMS, METHODS AND APPARATUS FOR CONVERTING BETWEEN WIRELESS PROTOCOLS," which is a continuation of U.S. patent application Ser. No. 15/228,456 filed Aug. 4, 2016, entitled "SYSTEMS, METHODS AND APPARATUS FOR CONVERTING BETWEEN WIRELESS PROTOCOLS," which are incorporated herein in their entirety by reference for all purposes.

BACKGROUND

A wireless wide area network (WWAN), is a form of wireless network that is capable of covering a large area. A WWAN may utilize mobile telecommunication cellular network technologies such as LTE, WiMAX, UMTS, CDMA2000, GSM, or other long-range protocols to transfer data. These technologies are provided by a wireless service provider. Depending on the protocol, frequencies, and physical properties of an area, the WWAN may not cover the area uniformly. For example, the WWAN may not be accessible from within certain buildings.

A wireless local area network (WLAN) is a wireless computer network that links two or more devices using a wireless distribution method within a limited area, such as a building. The WLANs may utilize the 802.11 family of protocols, also known as WiFi. Devices that are capable of communicating over a WLAN may not be capable of communicating over a WWAN, and vice versa.

SUMMARY

The present disclosure relates to systems, methods, and apparatus for wireless communication. In one implementation, a method for wireless communication includes receiving a first wireless signal in a first radio frequency spectrum using a first antenna exterior to a building, the first wireless signal being associated with a first wireless protocol; converting the first wireless signal into a first intermediate signal associated with a coaxial protocol; transmitting the first intermediate signal to an interior of the building using a coaxial cable; converting the first intermediate signal into a second signal associated with a second wireless protocol; and transmitting the second signal in a second radio frequency spectrum using a second antenna interior to the building, the second signal being transmitted using the second wireless protocol.

In some examples, the method further includes receiving a third wireless signal in the second radio frequency spectrum using the second antenna, the third wireless signal being associated with the second wireless protocol; converting the third wireless signal into a second intermediate signal associated with the coaxial protocol; transmitting the second intermediate signal to the exterior of the building using the coaxial cable; converting the second intermediate signal into a fourth signal associated with the first wireless protocol; and transmitting the fourth signal in the first radio frequency spectrum using the first antenna, the fourth signal being transmitted using the first wireless protocol.

In some examples, the coaxial protocol is a Multimedia over Coax Alliance (MoCA) protocol. In some examples, the method further includes combining the first intermediate signal with a received satellite signal; and transmitting the combined first intermediate signal and received satellite signal to the interior of the building using the coaxial cable. In some examples, the method further includes combining the second intermediate signal with control/command communications and electrical power; and transmitting the combined second intermediate signal, control/command communications, and electrical power to the exterior of the building using the coaxial cable.

In some examples, the first wireless protocol corresponds to a wireless wide area network (WWAN) protocol and the second wireless protocol corresponds to a wireless local area network (WLAN) protocol. In some examples, the first radio frequency spectrum and the second radio frequency spectrum include one or more non-contiguous frequency bands. In some examples, the first radio frequency spectrum includes one or more frequency bands that overlap with one or frequency bands of the second radio frequency spectrum. In some examples, one or more of the first wireless signal and the second wireless signal carry voice over IP (VoIP) data.

In one implementation, a wireless communication system includes a first antenna exterior to a building to receive a first wireless signal in a first radio frequency spectrum, the first wireless signal being associated with a first wireless protocol; an access device to convert the first wireless signal into a first intermediate signal and transmit the first intermediate signal to an interior of the building using a coaxial cable, the first intermediate signal being associated with a coaxial protocol; a conversion device interior to the building to convert the first intermediate signal into a second signal associated with a second wireless protocol; and a second antenna interior to the building to transmit the second signal in a second radio frequency spectrum using the second wireless protocol.

In some examples, the second antenna receives a third wireless signal in the second radio frequency spectrum, the third wireless signal being associated with the second wireless protocol; the conversion device converts the third wireless signal into a second intermediate signal associated with the coaxial protocol and transmits the second intermediate signal to the access device using the coaxial cable; the access device converts the second intermediate signal into a fourth signal associated with the first wireless protocol; and the first antenna transmits the fourth signal in the first radio frequency spectrum, the fourth signal being transmitted using the first wireless protocol.

In some examples, the coaxial protocol is a Multimedia over Coax Alliance (MoCA) protocol. In some examples, the access device combines the first intermediate signal with a received satellite signal and transmits the combined first intermediate signal and received satellite signal to the interior of the building using the coaxial cable. In some examples, the conversion device combines the second intermediate signal with control/command communications and electrical power; and transmits the combined second intermediate signal, control/command communications, and electrical power to the access device using the coaxial cable.

In some examples, the first wireless protocol corresponds to a wireless wide area network (WWAN) protocol and the second wireless protocol corresponds to a wireless local area network (WLAN) protocol. In some examples, the first radio frequency spectrum and the second radio frequency spectrum include one or more non-contiguous frequency bands. In some examples, the first radio frequency spectrum includes one or more frequency bands that overlap with one or more frequency bands of the second unlicensed radio frequency spectrum. In some examples, one or more of the first wireless signal and the second wireless signal carry voice over IP (VoIP) data.

In some examples, the system further includes a signal reception platform comprising the first antenna, the access device, a satellite antenna, and a mounting device. In some examples, the conversion device is integrally comprised within at least one of a receiving device and a display device.

It is to be understood that both the foregoing summary and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE DRAWINGS

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with receiving, processing, and outputting signals have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

Figure 1:
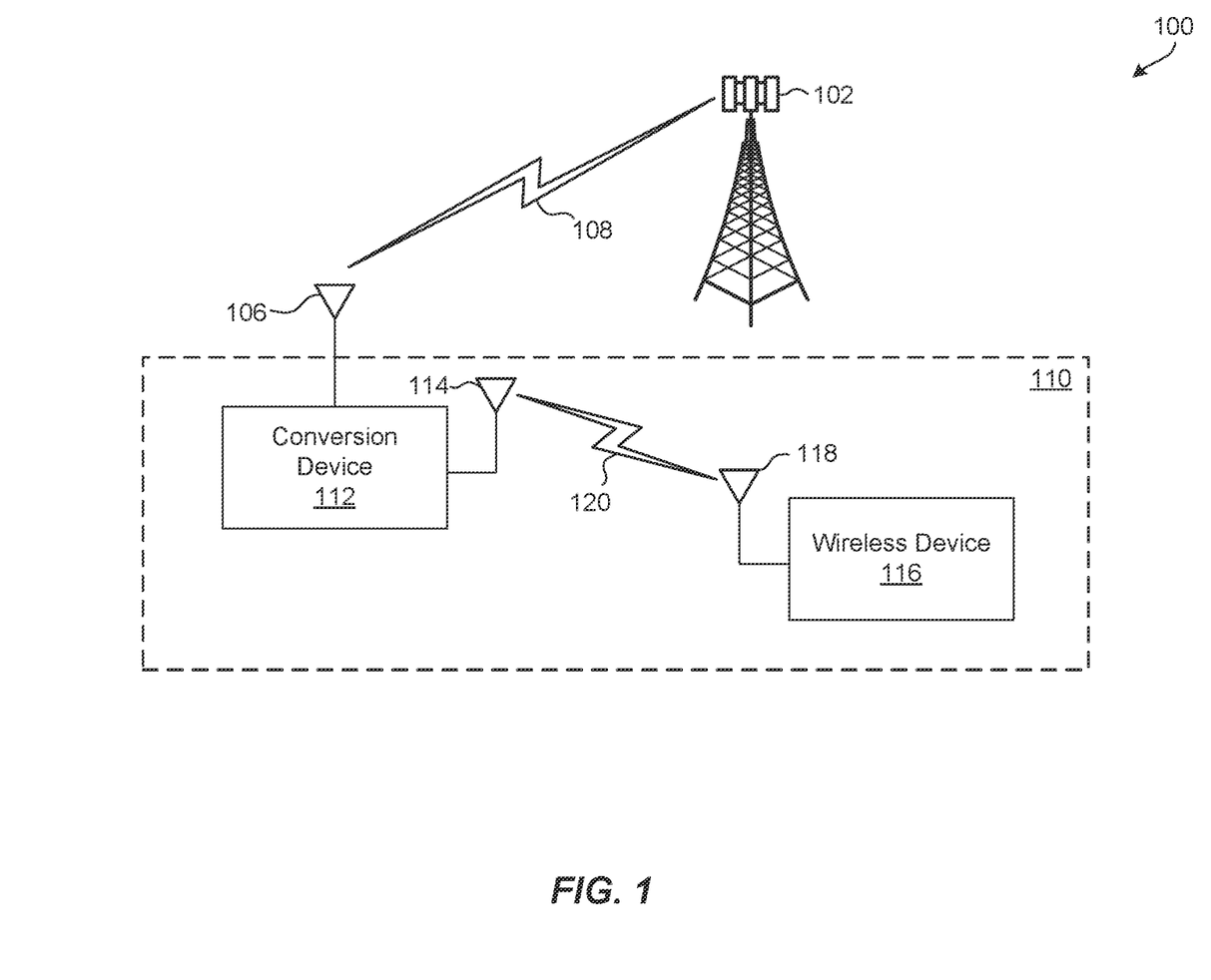
FIG. 1 illustrates an embodiment of a communication system, according to various aspects of the present disclosure.

FIG. 1 illustrates an embodiment of a communication system 100, according to various aspects of the present disclosure. A wireless service provider 102 provides wireless access to a data network. The wireless service provider 102 may provide wireless access using one or more protocols, such as Long-Term Evolution (LTE), LTE-Advanced (LTE-A), Unlicensed LTE (LTE-U), High Speed Packet Access (HSPA), Evolved High Speed Packet Access (HSPA+), Worldwide Interoperability for Microwave Access (WiMAX), License Assisted Access (LAA), or other 3GPP compliant standards.

A conversion device 112 communicates with the wireless service provider 102 by transmitting/receiving wireless wide area network (WWAN) signals 108. The WWAN signals 108 may be in a licensed radio frequency spectrum and/or an unlicensed radio frequency spectrum. In some examples, the WWAN signals 108 may utilize multiple, non-contiguous frequency bands of licensed and/or unlicensed radio frequency spectrum.

The conversion device 112 includes an exterior antenna 106 for communicating with the wireless service provider 102. The exterior antenna 106 may be an antenna array comprising multiple antennas. The exterior antenna 106, or a portion of the exterior antenna 106, may be exterior of a building 110 to improve communication with the wireless service provider 102.

The conversion device 112 receives WWAN signals 108 from the wireless service provider 102, and converts them to wireless local area network (WLAN) signals 120 for transmission in the interior of the building 110. The WLAN signals 120 may conform to one or more of the 802.11 family of protocols, and may utilize unlicensed radio frequency spectrum. In some examples, the frequency bands of the WLAN signals 120 may overlap with one or more frequency bands utilized by the WWAN signals 108. The WLAN signals 120 may also utilize non-contiguous frequency bands of the unlicensed radio frequency spectrum. The conversion device 112 transmits the WLAN signals 120 to a wireless device 116 using an interior antenna 114. The wireless device 116 receives the WLAN signals using device antenna 118. The interior antenna 114 and/or device antenna 118 may be an antenna array comprising multiple antennas.

The conversion device 112 also receives WLAN signals 120 from the wireless device 116. The conversion device 112 converts the WLAN signals 120 to WWAN signals 108 for communication with the wireless service provider 102. This allows a wireless device 116 inside of the building 110 to access the data network of the wireless service provider 102 in cases where the wireless device 116 does not support the protocol of the WWAN signals 108 and/or in cases where the WWAN signals 108 do not effectively penetrate the building 110. In some examples, the WWAN signals 108 and WLAN signals 120 may carry voice over IP (VoIP) data, and may allow a user in the interior of the building 110 to communicate using the wireless service provider's data network.

Figure 2:
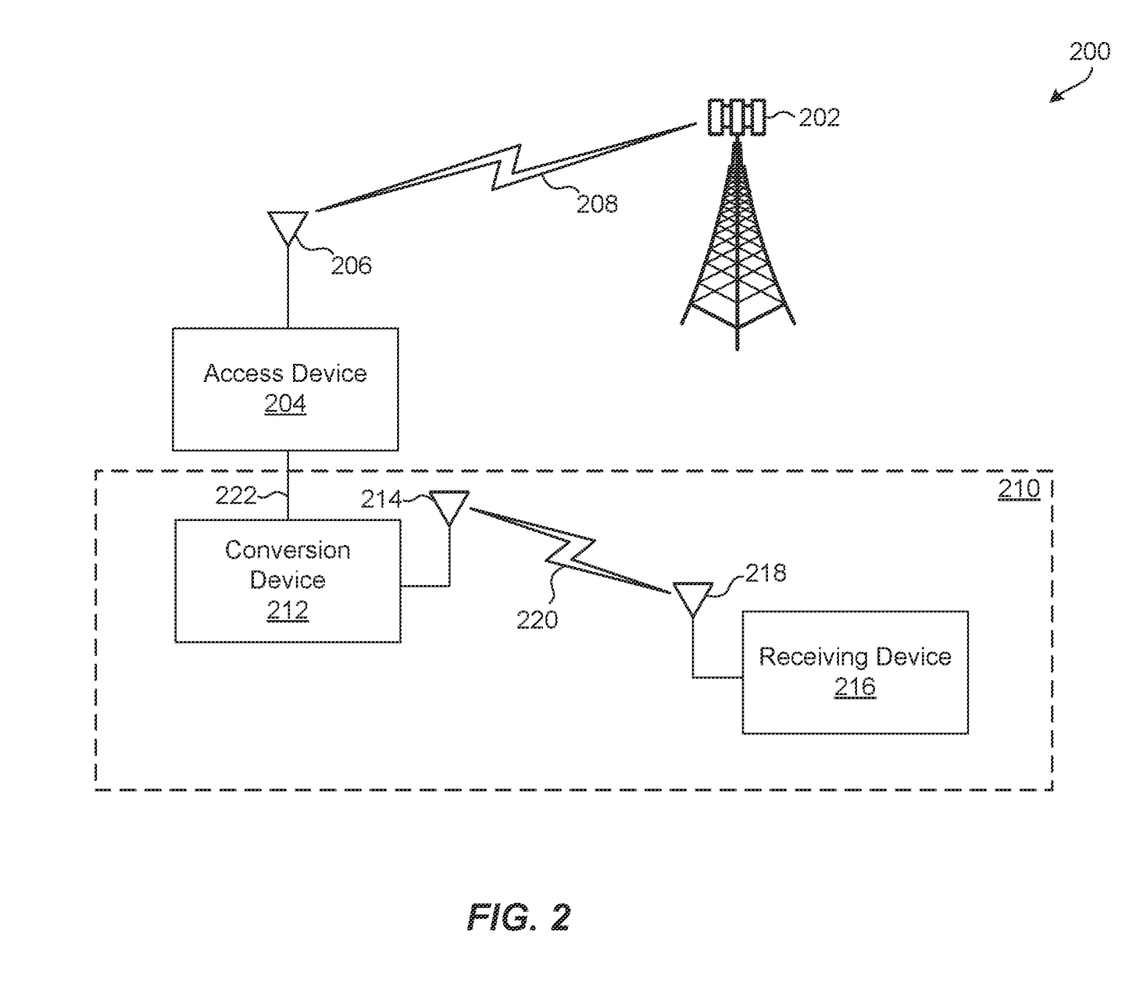
FIG. 2 illustrates another embodiment of a communication system, according to various aspects of the present disclosure.

FIG. 2 illustrates an embodiment of a communication system 200, according to various aspects of the present disclosure. A wireless service provider 202 provides wireless access to a data network. The wireless service provider 202 may provide wireless access using one or more protocols, such as LTE, LTE-A, LTE-U, HSPA, HSPA+, WiMAX, LAA, or other 3GPP compliant standards.

An access device 204 communicates with the wireless service provider 202 by transmitting/receiving WWAN signals 208. The WWAN signals 208 may be in a licensed radio frequency spectrum and/or an unlicensed radio frequency spectrum. In some examples, the WWAN signals 208 may utilize multiple, non-contiguous frequency bands of unlicensed and/or licensed radio frequency spectrum.

The access device 204 includes an exterior antenna 206 for communicating with the wireless service provider 202. The exterior antenna 206 may be an antenna array comprising multiple antennas. The access device 204 and exterior antenna 206 may be exterior of a building 210 to improve communication with the wireless service provider 202.

The access device 204 receives WWAN signals 208 from the wireless service provider 208, and routes them to the interior of the building 210 using a physical interface 222, such as coaxial cable or Ethernet cable. The access device 204 may reformat the WWAN signals 208 into intermediate signals that are transmittable over the physical interface 222. For example, the access device 204 may reformat the WWAN signals 208 into MoCA signals for transmission over a coaxial cable into the interior of the building 210.

A conversion device 212 receives the intermediate signals from the physical interface 222. The conversion device 212 converts the intermediate signals from the physical interface 222 to WLAN signals 220 for transmission in the interior of the building 210. The WLAN signals 220 may conform to the 802.11 family of protocols, and may utilize unlicensed radio frequency spectrum. In some examples, the frequency bands of the WLAN signals 220 may overlap with one or more frequency bands utilized by the WWAN signals 208. The WLAN signals 220 may also utilize non-contiguous frequency bands of the unlicensed radio frequency spectrum. The conversion device 212 transmits the WLAN signals 220 to a wireless device 216 using an interior antenna 214. The wireless device 216 receives the WLAN signals using device antenna 218. The interior antenna 214 and/or device antenna 218 may be an antenna array comprising multiple antennas.

The conversion device 212 also receives WLAN signals 220 from the wireless device 216. The conversion device 212 may reformat the WLAN signals 220 into intermediate signals that are transmittable over the physical interface 222. For example, the conversion device 212 may reformat the WLAN signals 220 into MoCA signals for transmission over a coaxial cable to the exterior of the building 210. In some examples, the conversion device 212 may also transmit command/control communications and/or electrical power over the physical interface 222 to the access device 204. The conversion device 212 may combine the command/control communications and/or electrical power with the intermediate signals.

The access device 204 then reformats the intermediate signals from the physical interface 222 into WWAN signals 208 for communication with the wireless service provider 202. This allows a wireless device 216 inside of the building 210 to access the data network of the wireless service provider 202 in cases where the wireless device 216 does not support the protocol of the WWAN signals 208 and/or in cases where the WWAN signals 208 do not effectively penetrate the building 210. In some examples, the WWAN signals 208 and WLAN signals 220 may carry VoIP data, and may allow a user in the interior of the building 110 to communicate using the wireless service provider's data network.

Figure 3:
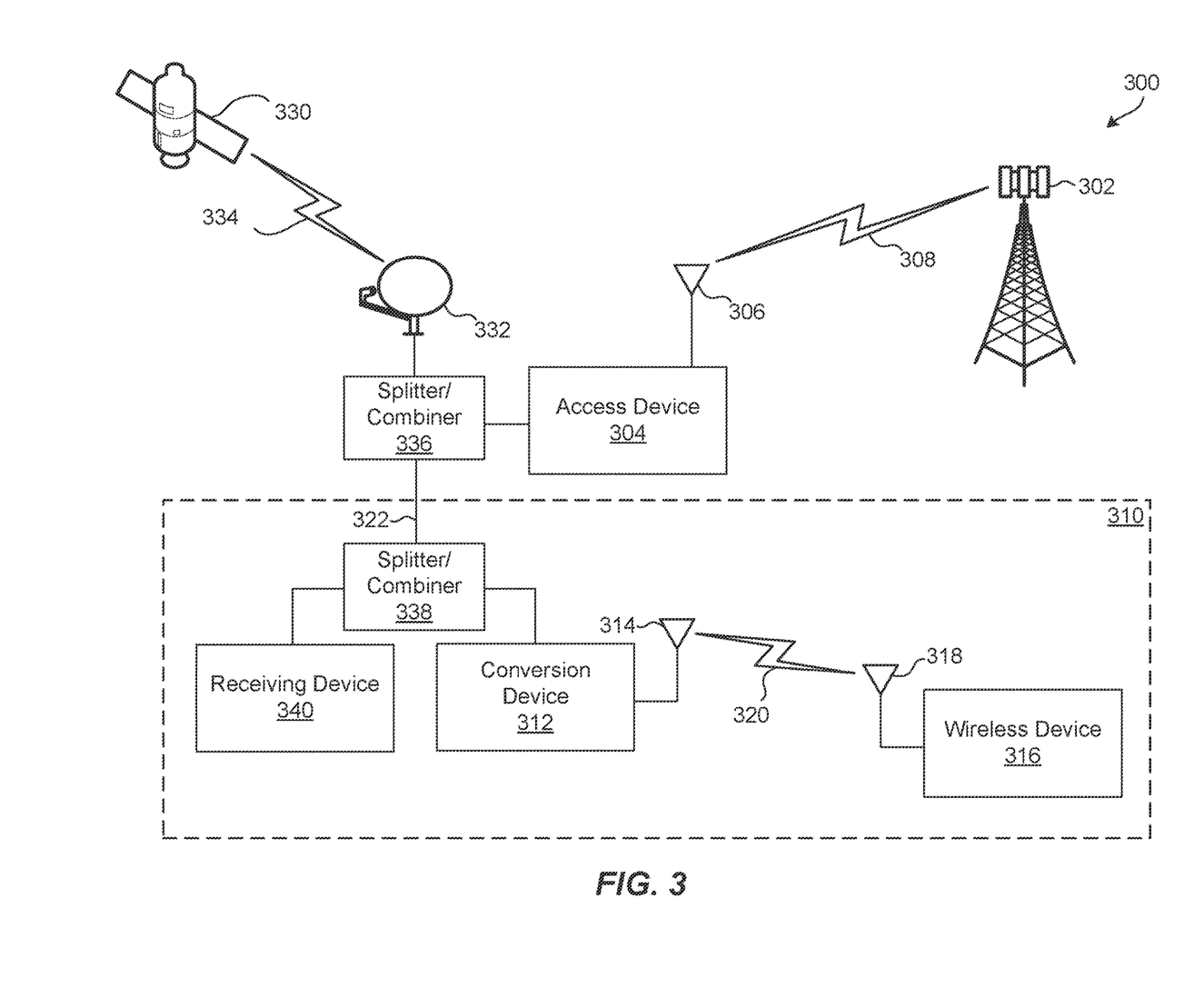
FIG. 3 illustrates yet another embodiment of a communication system, according to various aspects of the present disclosure.

FIG. 3 illustrates an embodiment of a communication system 300, according to various aspects of the present disclosure. A wireless service provider 302 provides wireless access to a data network. The wireless service provider 302 may provide wireless access using one or more protocols, such as LTE, LTE-A, LTE-U, HSPA, HSPA+, WiMAX, LAA, or other 3GPP compliant standards.

An access device 304 communicates with the wireless service provider 302 by transmitting/receiving WWAN signals 308. The WWAN signals 308 may be in a licensed radio frequency spectrum and/or an unlicensed radio frequency spectrum. In some examples, the WWAN signals 308 may utilize multiple, non-contiguous frequency bands of unlicensed and/or licensed radio frequency spectrum.

The access device 304 includes an exterior antenna 306 for communicating with the wireless service provider 302. The exterior antenna 306 may be an antenna array comprising multiple antennas. The access device 304 and exterior antenna 306 may be exterior of a building 310 to improve communication with the wireless service provider 302.

The access device 304 receives WWAN signals 308 from the wireless service provider 308. The access device 304 reformats the WWAN signals 308 into intermediate signals for transmission over a coaxial physical interface 322. In some examples, the intermediate signals are MoCA signals. The intermediate signals are received by a splitter/combiner 336. The splitter/combiner 336 combines the intermediate signals from the access device 304 with signals from a satellite antenna 332. The satellite antenna 332 may receive satellite signals 334 from one or more satellites 330. The satellite antenna 332 may include one or more low-noise frequency block downconverter with integrated feedhorns (LNBFs) which downconvert the satellite signals 334 for transmission over the coaxial physical interface 322. The splitter/combiner 336 combines the downconverted satellite signals and the intermediate signals and transmits the combined signals over a single coaxial physical interface 322 into the interior of the building 310.

A secondary splitter/combiner 338 receives the single coaxial physical interface 322 in the interior of the building 310. The secondary splitter/combiner 338 transmits the combined signals to a receiving device 340 and to a conversion device 312. The receiving device 340 may be a set-top box, digital video recorder (DVR), television, or other device for receiving and rendering satellite signals. The receiving device 340 may include one or more filters for filtering out the intermediate signals, and the conversion device 312 may include one or more filters for filtering out the downconverted satellite signals. Alternatively, in some embodiments, the secondary splitter/combiner 338 may filter the combined signals and transmit the intermediate signals to the conversion device 312 and the downconverted satellite signals to the receiving device 340. In some embodiments, the conversion device 312 and receiving device 340 may be combined into a single device. In addition, in some embodiments, the secondary splitter/combiner 338 may be a component of the conversion device 312 and/or receiving device 340.

The conversion device 312 converts the intermediate signals into WLAN signals 320 for transmission in the interior of the building 310. The WLAN signals 320 may conform to the 802.11 family of protocols, and may utilize unlicensed radio frequency spectrum. In some examples, the frequency bands of the WLAN signals 320 may overlap with one or more frequency bands utilized by the WWAN signals 308. The WLAN signals 320 may also utilize non-contiguous frequency bands of the unlicensed radio frequency spectrum. The conversion device 312 transmits the WLAN signals 320 to a wireless device 316 using an interior antenna 314. The wireless device 316 receives the WLAN signals using device antenna 318. The interior antenna 314 and/or device antenna 318 may be an antenna array comprising multiple antennas.

The conversion device 312 also receives WLAN signals 320 from the wireless device 316. The conversion device 312 may reformat the WLAN signals 320 into intermediate signals for transmission to the secondary splitter/combiner 338. In some examples, the intermediate signals are MoCA signals. In some examples, the secondary splitter/combiner 338 may also transmit command/control communications and/or electrical power over the physical interface 322 to the access device 304 and/or satellite antenna 332. The secondary splitter/combiner 338 may combine the command/control communications and/or electrical power with the intermediate signals, and the combined signal may be routed to the exterior of the building 310 over the single coaxial physical interface 322. In some examples, the command/control communications may be transmitted by the receiving device 340 to communicate with the satellite antenna 332, such as for selecting a satellite feed.

The exterior splitter/combiner 336 routes the intermediate signals from the physical interface 322 to the access device 304. The access device 304 then reformats intermediate signals into WWAN signals 308 for communication with the wireless service provider 302. This allows a wireless device 316 inside of the building 310 to access the data network of the wireless service provider 302 in cases where the wireless device 316 does not support the protocol of the WWAN signals 308 and/or in cases where the WWAN signals 308 do not effectively penetrate the building 310. In some examples, the WWAN signals 308 and WLAN signals 320 may carry VoIP data, and may allow a user in the interior of the building 110 to communicate using the wireless service provider's data network.

Figure 4:
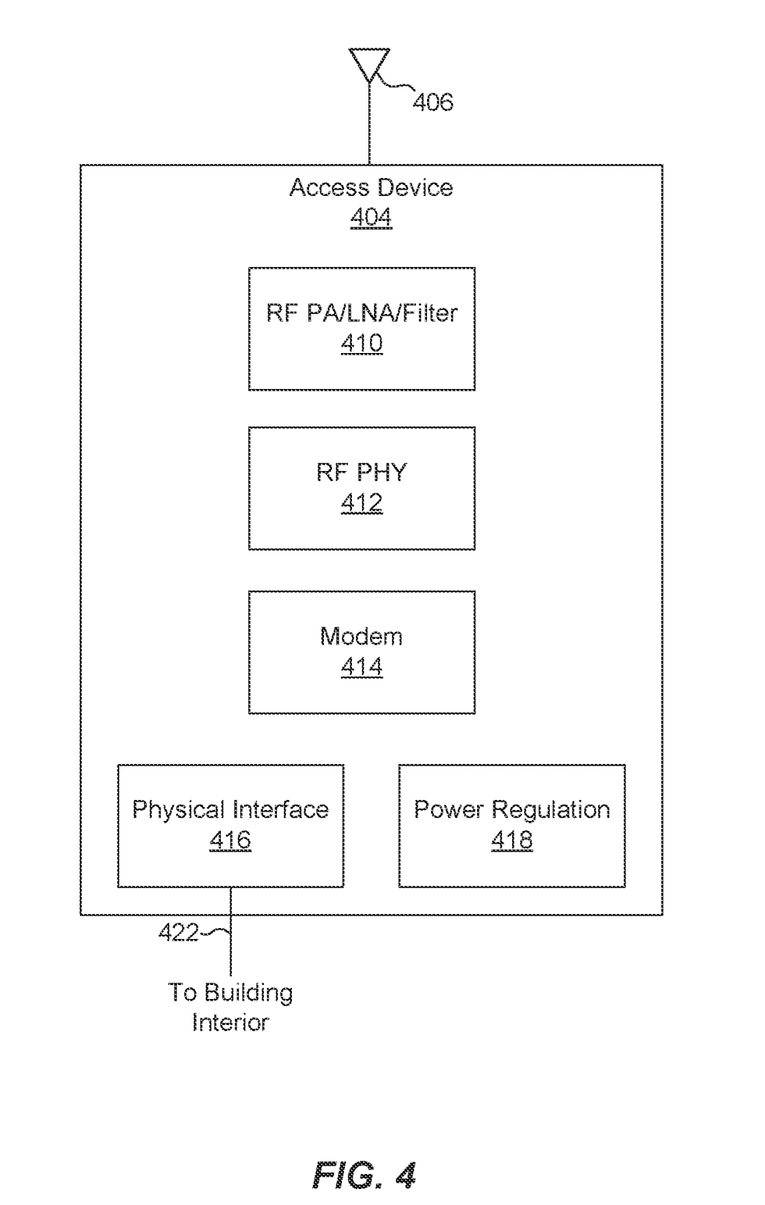
FIG. 4 illustrates an embodiment of an access device, according to various aspects of the present disclosure.

FIG. 4 illustrates an embodiment of an access device 404, according to various aspects of the present disclosure. The access device 404 may be an example of one or more of the access devices 104, 204, 304 described in reference to FIGS. 1-3. The access device 404 may be located in the exterior of a building. In some examples, the access device 404 may be mounted to or may be a component of a signal reception platform. The signal reception platform may include a satellite antenna and a mounting device for mounting the satellite antenna to the building. The access device 404 may include a weatherproof, UV resistant housing for protecting the various circuitry and components of the access device 404.

The access device 404 includes an antenna 406 for receiving WWAN signals from a wireless service provider. The antenna 406 also transmits WWAN signals to the wireless service provider. The WWAN signals may be in a licensed radio frequency spectrum and/or an unlicensed radio frequency spectrum and may use one or more wireless protocols including LTE, LTE-A, LTE-U, HSPA, HSPA+, WiMAX, LAA, or other 3GPP compliant standards. The antenna 406 may be an antenna array comprising multiple antennas.

The access device 404 may include radio frequency (RF) power amplifier (PA) circuitry, low noise amplifier (LNA) circuitry, and filter circuitry 410. The RF PA/LNA/Filter circuitry 410 may condition signals for transmission by the antenna 406 and may condition WWAN signals received by the antenna 406.

The access device 404 may further include RF physical layer (PHY) circuitry 412. The RF PHY circuitry 412 may include transceivers and/or signal processors capable of processing signals for transmission by the RF PA/LNA/Filter circuitry 410. The RF PHY circuitry 412 may be further capable of processing signals received from the RF PA/LNA/Filter circuitry 410.

In some embodiments, the access device 404 may include multiple sets of RF PA/LNA/Filter circuitry 410 and RF PHY circuitry 412. Each set of circuitry 410, 412 may correspond to an antenna in an antenna array and corresponding frequency band(s).

The access device 404 may further include a modem 414. The modem 414 may be capable of processing the signals from the RF PHY circuitry 412 in accordance with one or more of the wireless protocols used by the WWAN signals received by the antenna 406. For example, the modem 414 may be a LTE modem capable of processing LTE signals.

Physical interface circuitry 416 reformats signals from the modem 414 into intermediate signals for transmission over a physical interface 422, such as coaxial cable or Ethernet cable. In some examples, the physical interface circuitry 416 reformats the signals from the modem 414 into MoCA signals. The physical interface 422 may then route the intermediate signals into the interior of the building.

The physical interface circuitry 416 also receives intermediate signals from the interior of the building. The physical interface circuitry 416 may then reformat the received intermediate signals into signals that may be processed by the modem 414, RF PHY circuitry 412, and RF PA/LNA/Filter circuitry 410 for transmission over the antenna 406 to the wireless service provider.

Power regulation circuitry 418 regulates power received by the access device 404 and distributes the regulated power to the various circuitry and components of the access device 404. In some embodiments, the access device 404 may receive power from the physical interface 416. For example, electrical power may be provided over a coaxial cable or Ethernet cable plugged into the physical interface circuitry 416. The electrical power may be provided by a receiving device or conversion device in the interior of the building and connected to the access device 404 over the physical interface 422.

Figure 5:
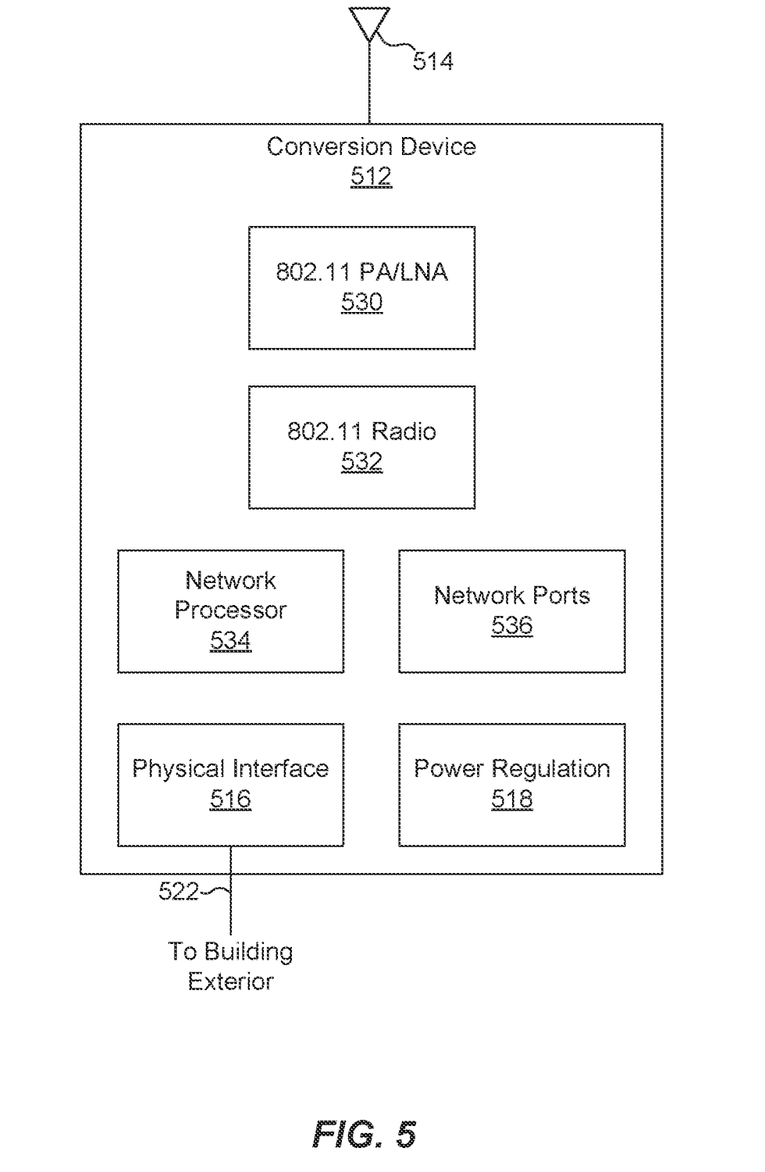
FIG. 5 illustrates an embodiment of a conversion device, according to various aspects of the present disclosure.

FIG. 5 illustrates an embodiment of a conversion device 512, according to various aspects of the present disclosure. The conversion device 512 may be an example of one or more of the conversion devices 112, 212, 312 described in reference to FIGS. 1-3. The conversion device 512 may be located in the interior of a building. In some examples, the conversion device 512 may be a component of a receiving device for receiving satellite television signals.

The conversion device 512 includes an antenna 514 for transmitting/receiving WLAN signals. The WLAN signals are transmitted and received in accordance with one or more of the 802.11 family of protocols. The antenna 514 may be an antenna array comprising multiple antennas.

The conversion device 512 may include 802.11 PA/LNA circuitry 530. The 802.11 PA/LNA circuitry 530 may condition signals for transmission by the antenna 514 in accordance with one or more of the 802.11 family of protocols. The 802.11 PA/LNA circuitry 530 may also condition WLAN signals received by the antenna 514 in accordance with one or more of the 802.11 family of protocols.

The conversion device 512 may further include 802.11 radio circuitry 532. The 802.11 radio circuitry 532 may include transceivers and/or signal processors capable of processing signals for transmission by the 802.11 PA/LNA circuitry 530. The 802.11 radio circuitry 532 may be further capable of processing signals received from the 802.11 PA/LNA circuitry 530.

In some embodiments, the conversion device 512 may include multiple sets of 802.11 PA/LNA circuitry 530 and 802.11 radio circuitry 532. Each set of circuitry 530, 532 may correspond to an antenna in an antenna array 514. In some examples, different antennas of the antenna array 514 may operate at different frequencies, such as 2.4 GHz and 5 GHz. Each set of circuitry 530, 532 may be configured to operate at one or more of the different frequencies.

A network processor 534 may provide the conversion device 512 with routing, switching, firewalls, and other networking capabilities. For example, the network processor 534 may route data to one or more devices connected wirelessly to the conversion device 512. The network processor 534 may also route data to one or more devices connected to network ports 536 of the conversion device 512. The network ports 536 may be, for example, Ethernet ports.

Physical interface circuitry 516 reformats signals from network processor 534 into intermediate signals for transmission over a physical interface 522, such as coaxial cable or Ethernet cable. In some examples, the physical interface circuitry 516 reformats the signals from the network processor 534 into MoCA signals. The physical interface 522 may then route the intermediate signals to the exterior of the building for transmission by an access device.

The physical interface circuitry 516 also receives intermediate signals from the exterior of the building. The physical interface circuitry 516 may then reformat the received intermediate signals into signals that may be processed by the network processor 534, 802.11 radio circuitry 532, and 802.11 PA/LNA circuitry 530 for transmission over the antenna 514 to one or more wireless devices.

Power regulation circuitry 518 regulates power received by the conversion device 512 and distributes the regulated power to the various circuitry and components of the conversion device 512. In some embodiments, the conversion device 512 may provide power over the physical interface 522 to an exterior access device. For example, phantom power may be provided over a coaxial cable or Ethernet cable plugged into the physical interface circuitry 516.

Figure 6:
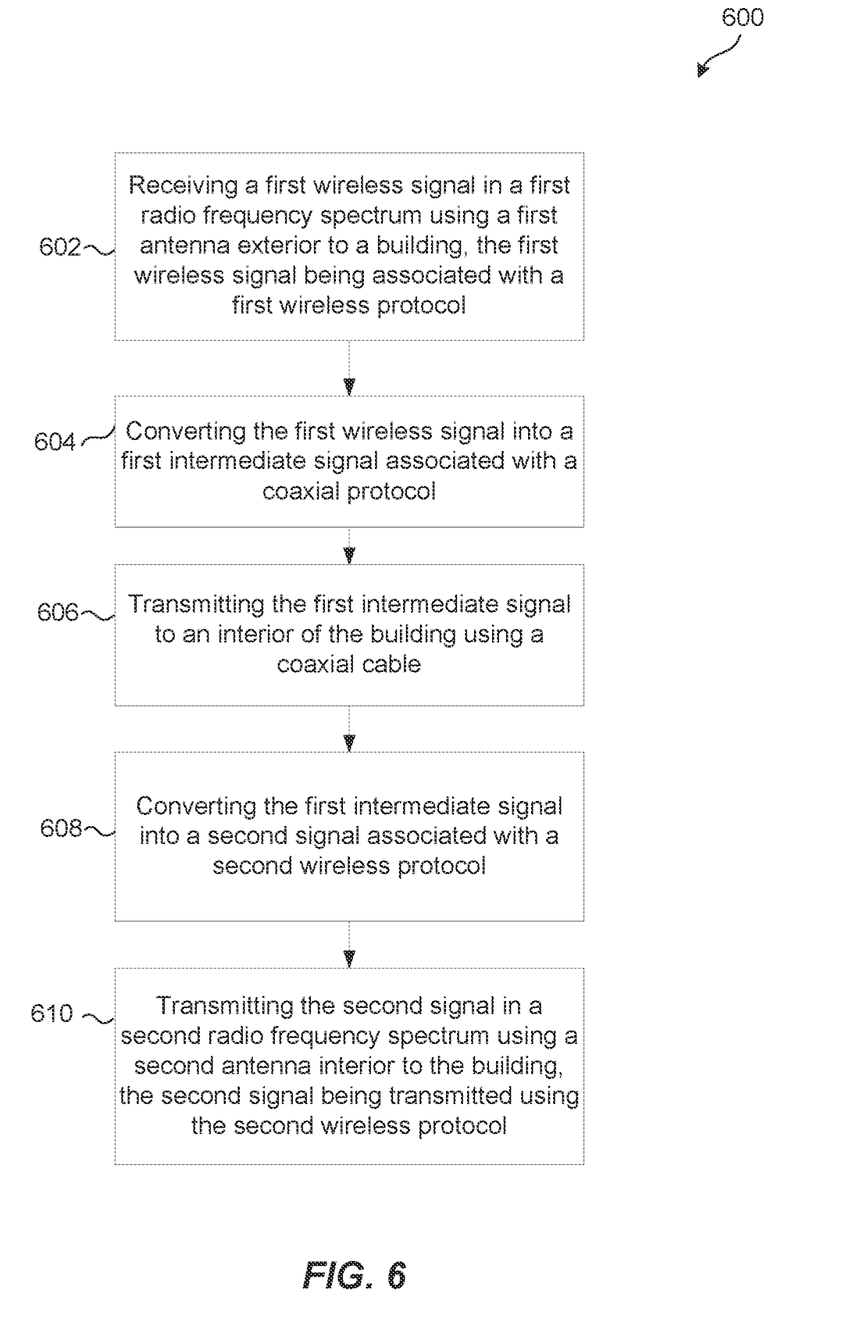
FIG. 6 is a flow diagram showing a method for converting wireless signals, according to various aspects of the present disclosure.

FIG. 6 is a flow diagram showing a method 600 for converting wireless signals, according to various aspects of the present disclosure. The method 600 may utilize one or more of the access devices and/or conversion devices described in reference to FIGS. 1-5.

At 602, the method 600 includes receiving a first wireless signal in a first radio frequency spectrum using a first antenna exterior to a building, the first wireless signal being associated with a first wireless protocol. The first wireless protocol may correspond to a wireless wide area network (WWAN) protocol.

At 604, the method 600 includes converting the first wireless signal into a first intermediate signal associated with a coaxial protocol. The coaxial protocol may be a Multimedia over Coax Alliance (MoCA) protocol.

At 606, the method 600 includes transmitting the first intermediate signal to an interior of the building using a coaxial cable.

At 608, the method 600 includes converting the first intermediate signal into a second signal associated with a second wireless protocol. The second wireless protocol may correspond to a wireless local area network (WLAN) protocol.

At 610, the method 600 includes transmitting the second signal in a second radio frequency spectrum using a second antenna interior to the building, the second signal being transmitted using the second wireless protocol. One or more of the first wireless signal and the second wireless signal may carry voice over IP (VoIP) data.

The method 600 may include additional acts, omit some acts, and/or may perform the acts in a different order than set out in the FIG. 6.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that many functions and/or operations within such block diagrams (e.g., the functions of the access device or conversion device), flowcharts, or examples can be implemented, individually and/or collectively, by a wide range of hardware, software, firmware, or virtually any combination thereof and that designing the circuitry and/or writing the code for the software and/or firmware would be well within the skill of one of ordinary skill in the art in light of the teachings of this disclosure. For example, the functions of the access device could be implemented in discrete logic with no central processing unit (CPU) or software involvement.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system (e.g., the network processor 534), apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. Aspects of the embodiments can be modified, if necessary, to employ systems, circuits and concepts of the various patents, applications and publications to provide yet further embodiments.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A wireless communication method, comprising:
receiving a wireless signal in a radio frequency spectrum using an antenna, the wireless signal being associated with a wide area wireless protocol;
performing a conversion process on the wireless signal so as to convert the wireless signal into an intermediate signal for a local network, wherein the intermediate signal has a frequency associated with a coaxial protocol, wherein the conversion process is performed by a conversion device having an interior antenna, wherein the conversion device is located in an interior of a building structure; and
transmitting the intermediate signal using the coaxial protocol.

2. The wireless communication method of claim 1, further comprising:
converting the intermediate signal into a second wireless signal associated with a local area wireless protocol; and
transmitting the second wireless signal in a second radio frequency spectrum using the local wireless protocol.

3. The wireless communication method of claim 1, wherein the coaxial protocol is a Multimedia over Coax Alliance (MoCA) protocol.

4. The wireless communication method of claim 1, further comprising:
combining the intermediate signal with a received satellite signal; and
transmitting the combined intermediate signal and the received satellite signal using the coaxial protocol.

5. The wireless communication method of claim 1, further comprising:
combining the intermediate signal with control/command communications and electrical power; and
transmitting the combined intermediate signal, control/command communications, and electrical power using the coaxial protocol.

6. The wireless communication method of claim 2, wherein the wide area wireless protocol corresponds to a wireless wide area network (WWAN) protocol and the local area wireless protocol corresponds to a wireless local area network (WLAN) protocol.

7. The wireless communication method of claim 2, wherein the radio frequency spectrum and the second radio frequency spectrum include one or more non-contiguous frequency bands.

8. The wireless communication method of claim 2, wherein the radio frequency spectrum includes one or more frequency bands that overlap with at least one frequency band of the second radio frequency spectrum.

9. The wireless communication method of claim 1, wherein the wireless signal carries voice over IP (VoIP) data.

10. A wireless communication system, comprising:
a first antenna exterior to a building to receive a first wireless signal in a first radio frequency spectrum, the first wireless signal being associated with a wide area wireless protocol; and
an access device to perform a conversion process on the first wireless signal so as to convert the first wireless signal into a first intermediate signal for a local network and transmit the first intermediate signal to an interior of the building using a coaxial cable, the first intermediate signal being associated with a coaxial protocol, wherein the conversion process is performed by a conversion device having an interior antenna, wherein the conversion device is located in an interior of a building structure.

11. The wireless communication system of claim 10, further comprising:
a conversion device interior to the building to convert the first intermediate signal into a second signal associated with a local area wireless protocol; and
a second antenna interior to the building to transmit the second signal in a second radio frequency spectrum using the local area wireless protocol.

12. The wireless communication system of claim 10, wherein the coaxial protocol is a Multimedia over Coax Alliance (MoCA) protocol.

13. The wireless communication system of claim 10, wherein:
the access device combines the first intermediate signal with a received satellite signal and transmits the combined first intermediate signal and received satellite signal to the interior of the building using the coaxial cable.

14. The wireless communication system of claim 11, wherein:
the conversion device combines the second intermediate signal with control/command communications and electrical power; and transmits the combined second intermediate signal, control/command communications, and electrical power to the access device using the coaxial cable.

15. The wireless communication system of claim 11, wherein the wide area wireless protocol corresponds to a wireless wide area network (WWAN) protocol and the local area wireless protocol corresponds to a wireless local area network (WLAN) protocol.

16. The wireless communication system of claim 11, wherein the first radio frequency spectrum and the second radio frequency spectrum include one or more non-contiguous frequency bands.

17. The wireless communication system of claim 11, wherein the first radio frequency spectrum includes one or more frequency bands that overlap with one or more frequency bands of the second radio frequency spectrum.

18. The wireless communication system of claim 10, wherein the first wireless signal carries voice over IP (VoIP) data.

19. The wireless communication system of claim 10, further comprising:
a signal reception platform comprising the first antenna, the access device, a satellite antenna, and a mounting device.

20. A non-transitory computer-readable media storing non-transitory executable instructions that when executed cause a computing system to perform a method for converting wireless communications comprising:
receiving a wireless signal in a radio frequency spectrum, the wireless signal being associated with a wireless wide area network (WWAN) protocol;
performing a conversion process on the wireless signal so as to convert the wireless signal into an intermediate signal for a local network, the intermediate signal being associated with a Multimedia over Coax Alliance (MoCA) protocol; and
transmitting the intermediate signal using the MoCA protocol, wherein the conversion process is performed by a conversion device having an interior antenna, wherein the conversion device is located in an interior of a building structure.

\* \* \* \* \*

UNITED STATES PATENT AND TRADEMARK OFFICE
CERTIFICATE OF CORRECTION

| | |
|---|---|
| PATENT NO. | : 12,034,888 B2 |
| APPLICATION NO. | : 17/346192 |
| DATED | : July 9, 2024 |
| INVENTOR(S) | : Mark Jackson and Paul Langer |

It is certified that error appears in the above-identified patent and that said Letters Patent is hereby corrected as shown below:

In the Claims

Claim 2, Line 23, insert --area-- after "local"

Signed and Sealed this
Twentieth Day of August, 2024

Katherine Kelly Vidal
*Director of the United States Patent and Trademark Office*